May 31, 1960 M. S. LEMMETTY 2,938,397
TRANSMISSION HAVING ADJUSTABLE HYDRAULIC
CLUTCHES FOR REVERSING AND FREE MOVEMENT
Filed July 22, 1954 2 Sheets-Sheet 2
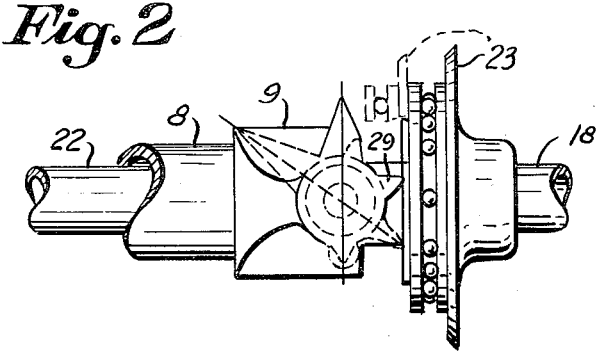
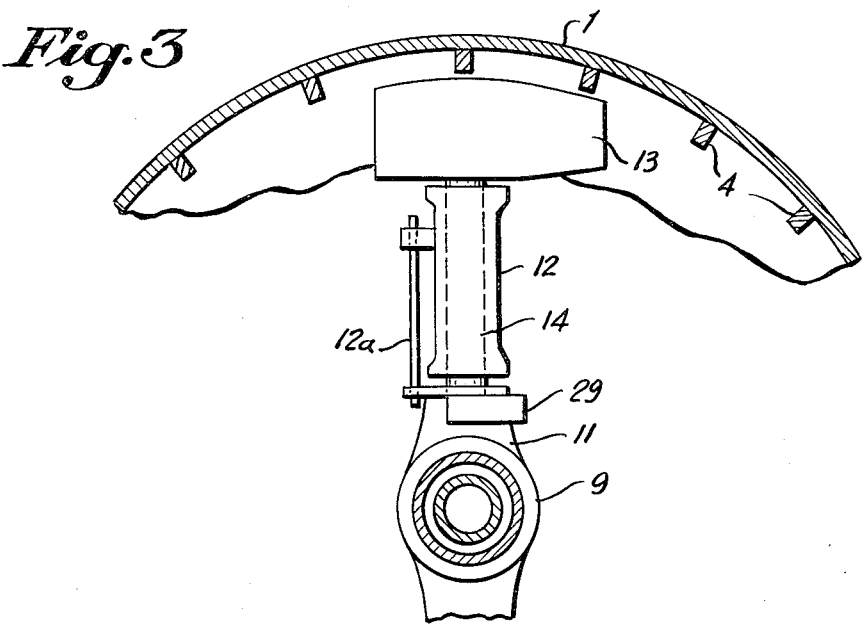
INVENTOR.
MATTI SALOMO LEMMETTY
BY
Richards & Geier.
ATTORNEYS

United States Patent Office 2,938,397
Patented May 31, 1960

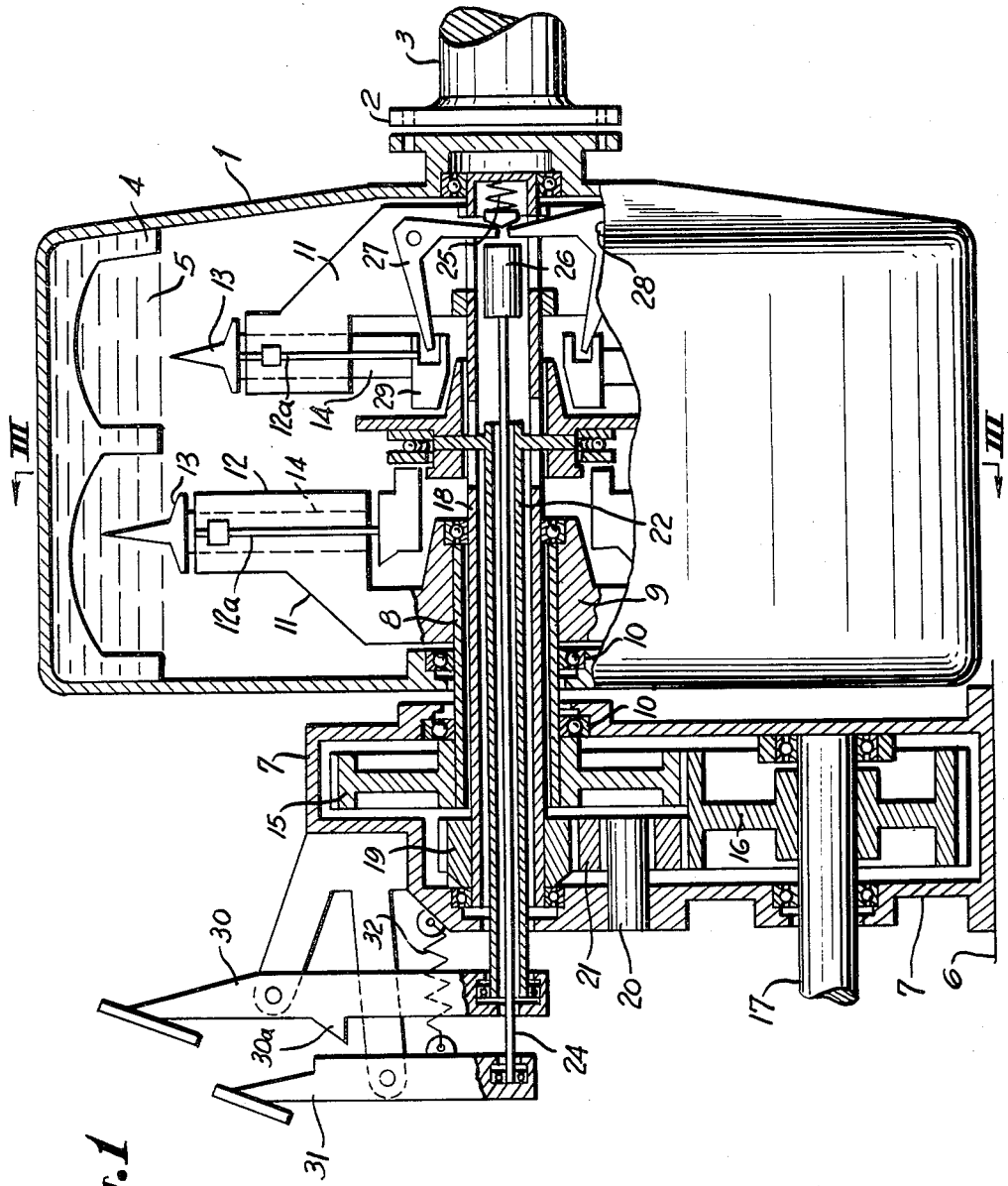

2,938,397

TRANSMISSION HAVING ADJUSTABLE HYDRAULIC CLUTCHES FOR REVERSING AND FREE MOVEMENT

Matti Salomo Lemmetty, Suistokatu 2, Porvoo, Finland

Filed July 22, 1954, Ser. No. 445,149

Claims priority, application Finland Aug. 19, 1953

2 Claims. (Cl. 74—330)

This invention relates to a transmission having adjustable hydraulic clutches for reversing movement and idling.

The regulation of the rotating speed between a motor and a driven shaft has not hitherto been satisfactorily solved. Toothed transmission gears require for each step of transmission corresponding gear wheels which work stepwise and hence do not go over smoothly from one speed to another. The frictional gears are unreliable and weak. The hydraulic turbine and pump type devices are complicated and expensive. Similarly, the piston, valve, and vane type devices are inferior with respect to efficiency.

An object of the present invention is to eliminate these drawbacks through the provision of a transmission having adjustable hydraulic clutches with the aid of which the transmission of power is accomplished steplessly and evenly. The speed of the driven shaft may be varied as desired from zero to maximum, the direction of rotation of the driven shaft may be reversed, or the driven shaft may be allowed to idle.

The present invention relates to an adjustable hydraulic clutch for reversing and free movement thereof, wherein the power transmission may be accomplished with the aid of a fluid ring produced by centrifugal force in a rotating vessel comprising a case circular in its transverse section and rotated by a motor. Inside of the case may be arranged two propeller devices with swingable blades. The propellers are fastened to a propeller hub through which is disposed a plurality of concentrically mounted hollow shafts. Transmission gears at one end of the hollow shafts and at one end of the driven shaft are coupled to each other. The propellers are adjustable with the aid of the lever devices in that the blades of one or the other propeller are turned from their zero or initial position to a desired degree when the pressure of the rotating hydraulic ring will act upon the blades, thereby driving them along with the ring with an evenly increasing or decreasing velocity depending upon the angle of the blades. The direction of rotation is changed or reversed according to the action of one or the other propeller.

The accompanying drawings illustrate by way of example a hydraulic clutch constructed according to the invention:

Figure 1 is a sectional elevation of the device.

Figure 2 is a radial end view of the propeller and

Figure 3 is a partial transverse section taken along the line III—III of Figure 1.

The rotating case 1 is coupled with a flange 2 of the driving shaft 3 of a motor. On the inner cylindrical mantle of case 1 is formed a plurality of ribs 4 disposed parallel to the rotating axle of the case to render the rotation of a fluid ring 5 within the case more effective. A gear box 7 is fixed upon a base 6 disposed upon the left side of case 1 (looking in the direction of Fig. 1).

An outer hollow shaft 8 extends into the gear box 7 and the rotating case 1. Toward the inner end of the shaft 8 inside the rotating case 1 is fastened a propeller hub 9 disposed upon ball bearings 10. Two diagonal arms 11 are coaxially fastened upon hub 9 and comprise a plurality of radially directed steering tubes 12. Inside each tube 12 is disposed a shaft 14 to one end of which is connected a propeller blade 13 and to another end of which is connected a lever 29. Lever 29 is constituted essentially of a series of spaced projections integrally formed along one side of its peripheral surfaces, as shown in Figure 2. A gear wheel 15 is fastened upon the opposite end of the hollow shaft 8 and is disposed in the gear box 7. The gear wheel 15 meshes with a gear wheel 16 which is fastened to a drive shaft 17 extending from box 7.

Inside the outer hollow shaft 8 is arranged a second hollow shaft 18. A gear wheel 19 is mounted on one end of shaft 18 in the gear box 7. The gear wheel 19 is disposed above and meshes with a gear wheel 21 carried by an intermediate shaft 20.

Inside the second hollow shaft 18 is arranged a third hollow shaft 22, one end of which is connected by a pin or other suitable means with a coupling flange 23. Inside the hollow shaft 22 are also arranged a push rod 24 and a spring 25 which presses the end of the rod 24 outwardly. On the right-hand end of rod 24 is arranged a piston-like member 26. Resting against the outer end of the piston-like member 26 there are arranged knee levers 27 which are secured by bolts 28 to the arms 11.

In a known manner, a pedal 30 is connected to the gear box 7 for use in the main direction of rotation and a pedal 31 is connected thereto for use in reversing. A spring 32 returns the pedal 31 to its initial or neutral position and torsional springs 12a return the propeller blades 13 to their neutral positions.

The clutch operates as follows:

In Figure 1 the clutch is shown in the zero or neutral free movement position. The case 1 is rotated by the driving shaft 3 and the fluid (such as oil) has, in consequence of the centrifugal force, formed a ring-shaped layer 5 against the inner mantle of case 1. The blades 13 do not participate in this rotation since they extend in the plane of rotation. By depressing the pedal 30 connected to the hollow shaft 22, the shaft 22 moves to the left along with the coupling flange 23 which will contact the left hand levers 29. The left propeller blades 13 will be turned obliquely across the rotating direction by means of the levers 29 whose spaced projections are deflected to one side upon contact with the flange 23. The blades 13 will begin to rotate and their rotation will be transmitted by the left hand arms 11, the shaft 8 and the gears 15 and 16 to the driven shaft 17. The impelling power on the blades increases according to the increasing angle into which the blades are turned, until in the extreme position, the speed of the propeller is practically the same as the speed of the driving motor.

For reversing, the pedal 31 is pressed down, moving the push rod 24 and the member 26 to the left, so that the spring 25 is freed to swing the knee levers 27 and cause them to move the right propeller blades 13 into the centrifugal hydraulic ring 5; thereafter, upon further contact the pedal 31 engages a projection 30a of the pedal 30 and moves the pedal 30 in the opposite direction, causing the hollow shaft 22 and the coupling flange 23 to move to the right. Then the flange 23 will engage the right hand levers 29 and they will swing the right propeller blades 13. At the same time the left propeller blades 13 have been turned back to their neutral positions with the aid of the torsional springs 12a. The transmission of power is now from the right hand arms 11 over the hollow shaft 18 and the gear wheels 19, 21, and 16 to the driven shaft 17 in the opposite, reversed direction.

In the direction shown in Figure 1 of the drawings the radial position of the left propeller 11 is fixed and the arrangement of the right propeller blades 11 is a radially movable one, so that these blades can be drawn out from contact with the hydraulic rotating ring 5.

The invention is not limited to the details of construction and arrangement herein shown and described, and many changes or modifications may be made therein within the scope of the appended claims.

I claim:

1. A transmission having hydraulic clutches, comprising in combination with a driving shaft and a driven shaft, a case rotated by said driving shaft, said case being adapted to be partly filled with a fluid forming by centrifugal action a hydraulic ring rotating along with said case, at least two propeller devices located side by side within said casing, rotary blades adapted to be located within said hydraulic ring, separate means carried by each propeller device and supporting said blades for swinging movement from a position wherein said blades extend in a plane of rotation of said ring to a position wherein said blades extend perpendicularly to said plane of rotation, and vice versa, the pressure of the ring upon said blades when they are inclined to said plane of rotation rotating said blades with a speed depending upon the angle of inclination of said blades, two hollow concentrical shafts, one of said shafts being connected with one of said propeller devices, the other one of said shafts being connected with the other one of said propeller devices, driving means for operatively connecting one of said shafts with said driven shaft to rotate the driven shaft in one direction and for operatively connecting the other one of said shafts with said driven shaft to rotate the driven shaft in the opposite direction, and means extending through said shafts and adapted to engage the first-mentioned means for selectively actuating the blades of each propeller device.

2. A transmission having hydraulic clutches, comprising in combination with a driving shaft and a driven shaft, a case rotated by said driving shaft, said case being adapted to be partly filled with a fluid forming by centrifugal action a hydraulic ring rotating along with said case, at least two propeller devices located side by side within said casing, rotary blades adapted to be located within said hydraulic ring, separate means carried by each propeller device and supporting said blades for swinging movement from a position wherein said blades extend in a plane of rotation of said ring to a position wherein said blades extend perpendicularly to said plane of rotation and vice versa, the pressure of the ring upon said blades when they are inclined to said plane of rotation rotating said blades with a speed depending upon the angle of inclination of said blades, two hollow concentrical shafts, one of said shafts being connected with one of said propeller devices, the other one of said shafts being connected with the other one of said propeller devices, driving means for operatively connecting one of said shafts with said driven shaft to rotate the driven shaft in one direction and for operatively connecting the other one of said shafts with said driven shaft to rotate the driven shaft in the opposite direction, means extending through said shafts and adapted to engage the first-mentioned means for selectively actuating the blades of each propeller device, and means connected with the first-mentioned means and actuated by the last-mentioned means for radially moving the blades of at least one propeller device in and out of said ring.

References Cited in the file of this patent

UNITED STATES PATENTS

| | | |
|---|---|---|
| 843,874 | Dorwald | Feb. 12, 1907 |
| 1,965,109 | Rudqvist | July 3, 1934 |
| 2,304,030 | Schmitter | Dec. 1, 1942 |
| 2,499,059 | Foos | Feb. 28, 1950 |

FOREIGN PATENTS

| | | |
|---|---|---|
| 412,723 | France | Feb. 17, 1910 |
| 863,980 | France | Apr. 15, 1941 |